Patented June 16, 1942

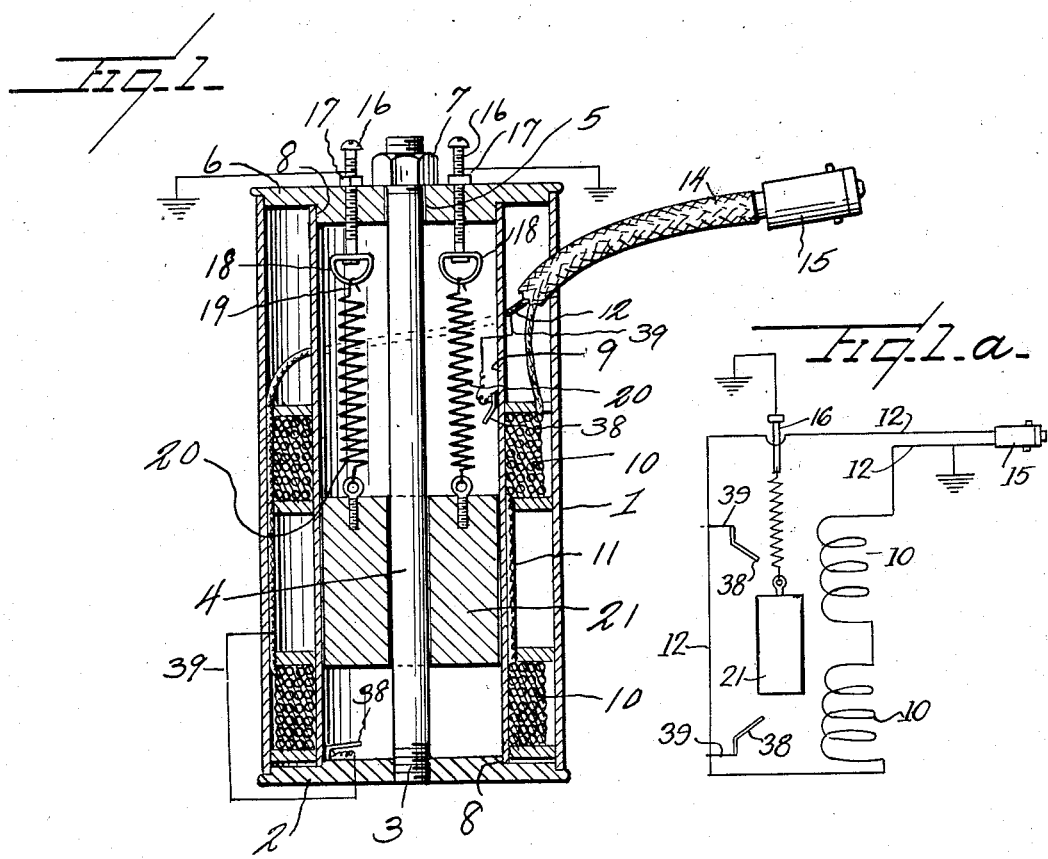
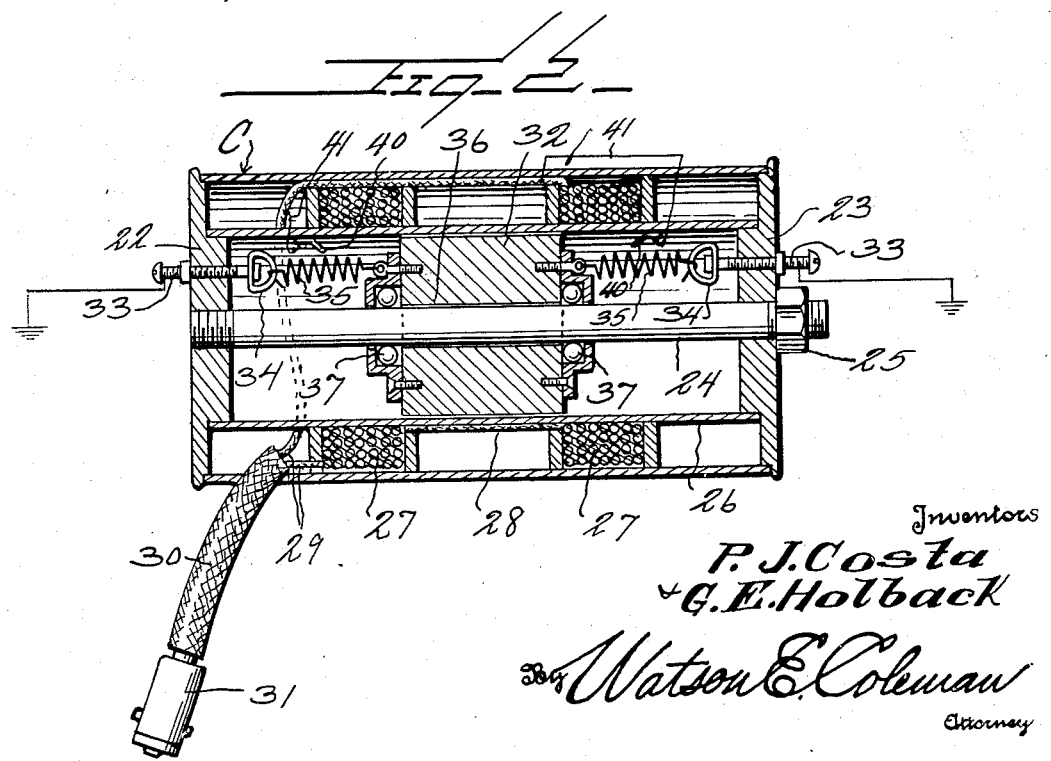

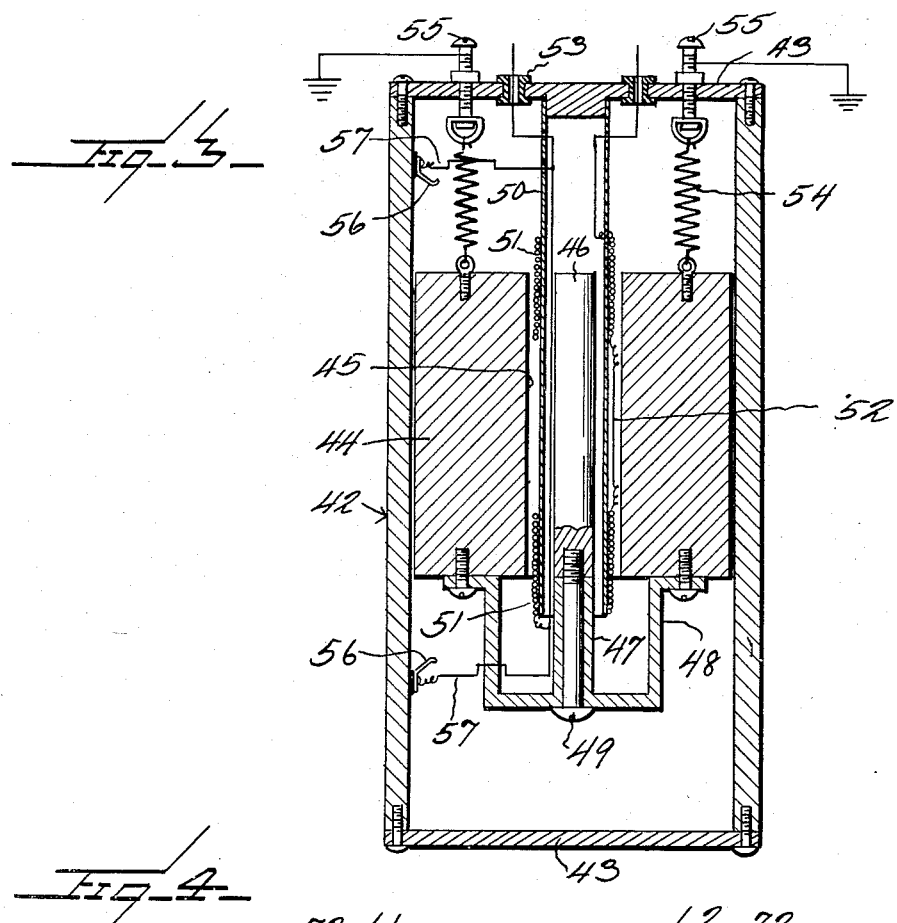
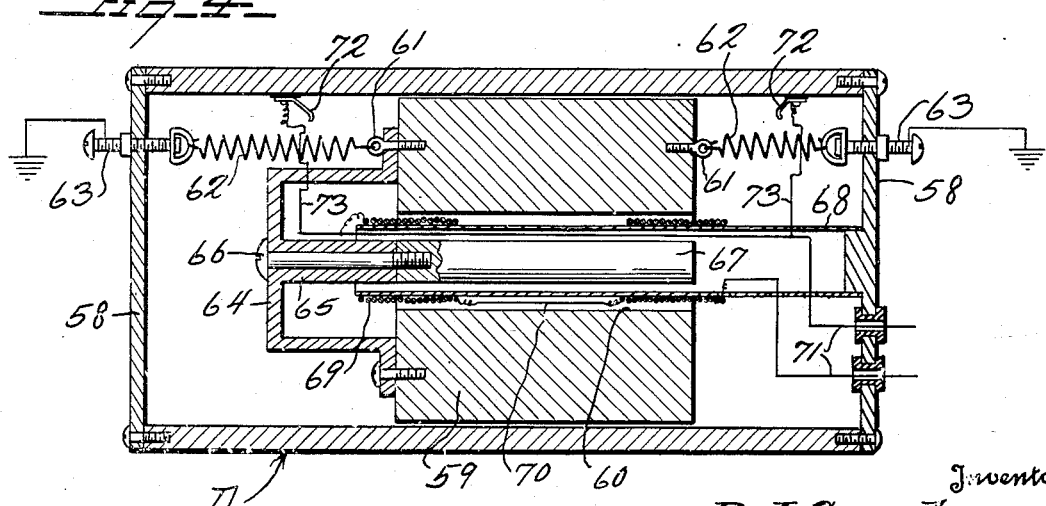

2,286,897

UNITED STATES PATENT OFFICE 2,286,897

VIBRATION PICKUP

Philip J. Costa and George E. Holback,
Yonkers, N. Y.

Application December 20, 1938, Serial No. 246,909

5 Claims. (Cl. 171—209)

This invention relates to a vibration pick-up, and it is an object of the invention to provide a device of this kind for use in connection with a suitable meter or recorder whereby mechanical vibration is converted into electrical impulses.

The invention also has for an object to provide a pick-up of this kind comprising two relatively movable members, one being a permanent magnet and the other a surrounding coil, the relative motion between the magnet and the coil inducing an electromotive force into the coil which is proportional to the vibratory velocity, said electromotive force allowing a record of the vibration to be obtained both as to amplitude and frequency of the vibration.

The invention consists in the details of construction and in the combination and arrangement of the several parts of our improved vibration pick-up whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Figure 1 is a view partly in section and partly in elevation of a pick-up for linear vertical vibrations;

Figure 1ª is a diagrammatic view particularly illustrating the circuits as comprised in the device as illustrated in Figure 1.

Figure 2 is a view partly in section and partly in elevation of a further embodiment of our invention to pick up linear horizontal vibration;

Figure 3 is a view partly in section and partly in elevation illustrating a pick-up for linear vertical vibration constructed in accordance with another embodiment of our invention;

Figure 4 is a view also partly in elevation and partly in section illustrating a pick-up for linear horizontal vibration constructed in accordance with a still further embodiment of our invention.

As disclosed in Figure 1, I denotes a tubular member or cylinder of desired dimensions which has its lower end closed by the head or plate 2. Secured, as at 3, to the head or plate 2 and extending axially through the member I is an elongated member or post 4. The upper end portion of this post 4 is disposed through an opening 5 at the axial center of the plate or head 6 for closing the top of the member I. The heads or plates 2 and 6 are effectively maintained in applied position with respect to the member I by the clamping nut 7 threading upon the upper end portion of the member or post 4 and contacting from above with the applied head or plate 6.

The opposed faces of the applied plates or heads at their centers are provided with the outstanding or inwardly disposed annular shoulders 8 which are snugly received within the opposite end portions of the tubular member or sleeve 9 which bridges the space between the plates or heads 2 and 6.

Carried by this tubular member or sleeve 9 at points spaced lengthwise thereof are the coils 10 connected in series by the lead 11 to reverse polarities of the coils and also having leading therefrom the conductors 12 which extend exteriorly of the member I to a suitable casing 14 of a terminal coupler 15. This terminal coupler 15 is adapted to be suitably hooked up with a desired meter or recorder to give a desired reading of electrical impulses created by the apparatus both as to amplitude and frequency. Meters or recorders of this kind are well known and as such an instrument forms no part of the present invention a disclosure thereof is believed unnecessary.

Threading from above through the top plate or head 6 at opposite sides of the post or member 4 are threaded shanks 16. Operatively engaged with the shanks 16 and coacting with the outer face of the plate or head 6 are the lock nuts 17 functioning in a well known manner.

The inner or inserted ends of the shanks 16 are provided with the clevises 18 or the like with which are engaged, as at 19, the upper extremities of the coil springs 20. These coil springs 20 constitute hangers or suspenders for the permanent magnet 21 freely positioned within the tubular member or sleeve 9. The magnet 21, as is clearly illustrated in the accompanying drawings, is provided therethrough with an axially disposed opening whereby said magnet 21 may be readily mounted upon the member or post 4 and in a manner whereby the magnet 21 is effectively held against side play which would cause erroneous results.

The relative motion between the magnet 21 and the coils 10 induces an electromotive force into the coils 10 which is proportional to the vibratory velocity. Since the polarity of the induced voltage depends on the direction of motion of the coil and whether it is passing over the north or south pole of the magnet, is the reason why two coils 10 are used. One of these coils 10 is over the north pole of the magnet 21 and the other the south pole. These coils 10 act in a push-pull arrangement so as to add their respective induced voltages. The coils 10 are also so spaced so that the total magnetic flux induced in both coils remains constant for vibrations that do not exceed the desired amplitude. Since the total magnetic flux is constant, the induced voltage will be absolutely linear with respect to velocity. The magnet 21 is placed within the field defined by the coils to assure maximum efficiency.

The operating range of the magnet 21 with respect to the coils 10 may readily be shifted as desired upon proper adjustment of the screws 16.

In practice the device is secured where desired to locate vibration and, as is believed to be obvious, the closer the placement of the device to the source of vibration the greater the amplitude of the electrical impulses. It is also believed to be apparent that our improved device, as herein disclosed, can be used to detect any vibrations of structures, engine vibrations, vibrations of voice and sound, earth eruption, etc.

In the embodiment of our invention as illustrated in Figure 2, the device is intended to pick up horizontal linear vibrations and as disclosed this embodiment comprises the outer tubular member or casing C of desired dimensions and having its opposite ends closed by the plates or heads 22 and 23 maintained in applied position through the medium of the elongated member or post 24. This post 24 has one end secured to the plate or head 22 and the opposite end portion disposed through the second head or plate 23. Threading on this post or elongated member 24 and coacting with the outer face of the plate or head 23 is a holding nut 25. The plates or heads are also constructed to maintain in proper position an inner tubular member or sleeve 26 surrounded at points spaced therealong by the coils 27 connected in series by the lead 28. These coils 27 also have leading therefrom the output conductors 29 which extend exteriorly of the member or casing C through the sheathing 30 and in proper connection with the terminal coupler 31. This coupler 31 is for connection with a suitable meter or kindred instrument.

In practice, the member or casing C is secured in desired placement with its longitudinal axis substantially horizontally disposed and arranged within the tubular member or sleeve 26 is a permanent magnet 32. Adjustably disposed through the plates or heads are the shanks 33, the inner end portions of which are provided with the clevises 34. Secured to these clevises 34 and to the opposite ends of the magnet 32 are the coil springs 35, the tension of which is regulated or controlled upon endwise adjustment of the shanks 33. The magnet 32 at its axial center is provided therethrough with an opening or bore 36 through which is freely directed the elongated member or post 24 hereinbefore referred to.

The opposite end portion of the permanent magnet 32 carries suitable anti-friction means 37 for coaction with the elongated member or post 24.

We have found it of importance that the springs 20 or 35 be of a coil type and that such springs must be made sufficiently weak so that in the designed operating range of either of the apparatus or instruments hereinbefore described, the magnet 21 or 32 practically stands still in space when the coils 10 or 27 are vibrating. This is an essential feature of the invention.

It is also to be particularly pointed out that proper electrical impulses will be carried out through the conductors 12 or 29 when the range of vibration of the instrument is insufficient to cause the longitudinal center of the magnet 21 or 32 to pass within the field of either of the coils 10 or 27. When there may be such intersection between the longitudinal center of the magnet 21 or 32 and the coils 10 or 27 distorted impulses are set up and which are of no value in determining any particular reading or calibration. Therefore, we find it of importance to provide means whereby either of the apparatus or instruments is shorted or shunted during such abnormal conditions.

Again referring to the embodiment of the invention as illustrated in Figure 1, it is to be noted that the sleeve 9 carries therein above and below the magnet 21 the resilient contact members 38 in electrical connection through the leads 39 with the non-grounded conductor 12. These contacts 38 are so positioned that in the event the magnet 21 should have its longitudinal center pass within either of the coils 10, such magnet 21 will engage either of these contacts 38 and then shunt out the electrical impulses so that there will be no recording of the impulses at the meter or kindred instrument with which the conductors 12 may be coupled. The circuit through the leads 39 and the contacts 38 will be grounded through the magnet 21, springs 20 and shank 16 while the circuit through the contacts 40 and leads 41 will be closed through the springs 35 and the shanks 33. This non-recording will readily give indication to the reader that the vibrations at that time were beyond the designed range of the apparatus or device.

In Figure 2, the contacts 40 are provided at opposite sides of the magnet 32 for the same purpose as just stated with respect to the contacts 38. These contacts 40 are also connected by the leads 41 with the non-grounded conductor 29.

In other words, the coaction between the magnet 21 and the contacts 38 or the magnet 32 with the contacts 40 assures no recordings should either of these magnets go beyond its range as determined by the longitudinal center of the magnet entering its associated coils.

In the embodiment of our invention as illustrated in Figure 3, 42 denotes a tubular casing of desired dimensions closed at its opposite ends by the heads 43 preferably removable. This embodiment of the invention is also of a vertical type and snugly arranged within the casing 42 but free for vibratory movement therein is an annular permanent magnet 44. This magnet 44 defines a vertically directed opening 45 disposed through the axial center of said magnet and positioned at the center of this opening 45 and of a length coextensive therewith is a core 46 of soft iron. This core 46 is of a diameter materially less than the diameter of the opening or bore 45 and is also of substantially the same diameter from one end to the other with its opposite ends flat. The lower flat end of the core 46 contacts from above with a tubular post 47 which is preferably integral with a suitably designed bracket 48 secured to and depending from the bottom of the magnet 44. This bracket 48 together with the sleeve 47 are of a non-magnetic material and the bore of the post 47 is open at both ends so that a holding bolt 49, also of a non-magnetic material, may be inserted from below for proper holding engagement with the lower end portion of the core 46.

Operatively secured to the upper plate or head 43 at the axial center thereof is an elongated member 50 preferably in the form of a tube and made of heavy paper stock although other material non-conductive of electricity may be used. Heavy paper stock is preferred, however, in view of the fact that it assures lightness. This member 50 is of a length to extend down from the top plate or head 43 and through and beyond the magnet 44. While this member 50 is of a diameter less than the diameter of the central opening or bore 45 of the magnet 44 it is also of sufficient internal diameter to permit the ready and free admission of the core 46 into said member 50 from below. This member 50 constitutes a carrier for the coils 51 arranged upon the member 50 at points spaced lengthwise thereof. These coils 51 are connected in series by a lead 52 to reverse polarity of the coils, and said coils also have leading therefrom the output conductors 53 for hookup with a recording meter or kindred instrument as has hereinbefore been set forth with respect to the previous embodiments of our invention.

The magnet 44 has secured thereto at radially spaced points the lower extremities of the coil springs 54 which are also operatively engaged with the inserted end portions of the shanks 55 threading through the upper or top plate or head 43. These springs 54 provide hangers or suspenders for the permanent magnet 44.

When the magnet 44 is in quiescence its longitudinal center is substantially midway of the coils 51.

The operation of the apparatus or instrument as disclosed in Figure 3 is substantially the same as hereinbefore set forth with respect to the instrument as illustrated in Figure 1.

The casing 42 has secured therein at required locations above and below the magnet 44 the resilient contacts 56 each being electrically connected by a lead 57 with the non-grounded conductor 53. The purpose of these contacts 56 is the same as has hereinbefore been set forth with respect to the contacts 38 and 40. The circuit through the contacts 56 and the leads 57 will be closed through the magnet 44, springs 54 and shanks 55.

It is to be noted that the post 47 is of such length as to avoid contact of the bracket 48 with the lower end of the member or carrier 50 unless said vibration should be materially out of or beyond its designed range.

The embodiment of the invention as illustrated in Figure 4 is of a horizontal type and comprises a casing D of desired dimensions and having its ends closed by the heads or plates 58 also preferably removable. In use the casing D is applied with its longitudinal axis horizontally disposed and snugly fitting within the casing D but free for vibration therein is a permanent magnet 59 also of an annular type and providing therethrough a central opening 60.

Connected to the opposite ends of the magnet 59 and at the upper part thereof, as at 61, are the coil springs 62 which are also operatively connected with the inserted end portions of the shanks 63 threading through the end plates or heads 58. One end of the magnet 59 has secured thereto an outstanding bracket 64 which is provided with a tubular post 65 extending toward the magnet 59 and at the axial center thereof.

This bracket 64 and post 65 are also of a non-magnetic material. Disposed through the post 65 is a headed member 66 also of non-magnetic material which has operative engagement with an end portion of a soft iron core 67 which is arranged axially of the opening 60 of the magnet 59 and of a length coextensive with the length of said opening 60. The end plate or head 58 remote from the bracket 64 operatively carries an elongated tubular member or carrier 68 disposed through the opening 60 of the magnet and which also surrounds the core 67. This member or carrier 68 is provided with the longitudinally spaced surrounding coils 69 which are also electrically connected by a lead 70 in series to reverse polarities of the coils. The coils 69 also have leading therefrom the output conductors 71.

The springs 62 normally maintain the longitudinal center of the magnet 59 midway between the coils 69.

The casing D fore and aft of the magnet 59 is also provided with the resilient contact members 72. These contact members 72 are connected by the leads 73 with the non-grounded output conductors 71. The circuit through the contact 72 and the lead 73 will be grounded through the magnet 59, springs 62 and shanks 63.

The general purpose and operation of the instrument or device as illustrated in Figure 4 is substantially the same as has hereinbefore been set forth with respect to the other embodiments of our invention.

It is believed to be understood that the contact members 72 are so positioned upon the casing D that the magnet 59 will engage one of said contacts in the event the magnet should move a distance to bring its longitudinal center within a coil 69.

In each of the embodiments of our invention as herein disclosed, the instrument is a voltage operated device and by having the coils in series the greatest voltage variation is obtained. By having the coils in series the voltage is totaled and internal voltage distortion is eliminated. This is important because in the embodiments of our invention as herein comprised the vibrations are measured by voltage and not by current and if the voltage output should be distorted either of the devices loses its value as a recording instrument.

From the foregoing description it is thought to be obvious that a vibration pick-up constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. A vibration pick-up comprising a tubular member, heads for closing the ends of the member, a rod disposed thru the tubular member and engaged with the heads to hold the heads in place, a permanent magnet within the tubular member free for reciprocation created by vibration, said permanent magnet being also freely mounted on the rod connecting the heads to hold the magnet against side play, a pair of coils surrounding the tubular member and connected in series and in opposition, said coils being spaced apart along the tubular member, yieldable means for normally holding the magnet, when the magnet and coils are in quiescence, with its center substantially midway of the coils, and output conductors leading from the coils for the electrical impulses induced by the relative reciprocations of the magnet and the coils.

2. A vibration pick-up comprising an elongated member to be secured to a vibrating element, a permanent magnet free for reciprocation caused by vibration, a pair of coils surrounding the member and spaced apart therealong, means for maintaining the magnet, when the coils and magnet are in quiescence, with its center substantially midway of the coils, said coils being connected in series and in opposition, said means being yieldable and of a tension to allow the magnet to practically stand still when the member and coils thereon are vibrating, and output conductors leading from the coils for the electrical impulses induced by the relative reciprocations of the magnet and the coils.

3. A vibration pick-up comprising an elongated member to be secured to a vibrating element, a permanent magnet free for reciprocation caused by vibration, a pair of coils surrounding the member and spaced apart therealong, means for maintaining the magnet, when the coils and magnet are in quiescence, with its center substantially midway of the coils, said coils being connected in series and in opposition, said means being yieldable and of a tension to allow the magnet to practically stand still when the member and coils thereon are vibrating, output conductors leading from the coils for the electrical impulses induced by the relative reciprocations of the magnet and the coils, and adjustable means associated with the first named means for shifting the operating range of the magnet with respect to the coils.

4. A vibration pick-up comprising an elongated member to be secured to a vibrating element, a permanent magnet free for reciprocation caused by vibration, a pair of coils surrounding the member and spaced apart therealong, means for maintaining the magnet, when the coils and magnet are in quiescence, with its center substantially midway of the coils, said coils being connected in series and in opposition, said means being yieldable and of a tension to allow the magnet to practically stand still when the member and coils thereon are vibrating, output conductors leading from the coils for the electrical impulses induced by the relative reciprocation of the magnet and the coils, and means for shunting the electrical impulses when the center of the magnet passes within either of the coils.

5. A vibration pick-up comprising an elongated member to be secured to a vibrating element, a permanent magnet free for reciprocation caused by vibration, a pair of coils surrounding the member and spaced apart therealong, means for maintaining the magnet, when the coils and magnet are in quiescence, with its center substantially midway of the coils, said coils being connected in series and in opposition, said means being yieldable and of a tension to allow the magnet to practically stand still when the member and coils thereon are vibrating, output conductors leading from the coils for the electrical impulses induced by the relative reciprocations of the magnet and the coils, the member being tubular and the magnet freely surrounding the member, a core of soft iron carried by the magnet and extending within the tubular member, said core being of a length coextensive with the length of the magnet, and means for insulating the core from the magnet.

PHILIP J. COSTA.
GEORGE E. HOLBACK.